United States Patent
Lv et al.

(10) Patent No.: US 10,454,505 B2
(45) Date of Patent: Oct. 22, 2019

(54) MULTI-FREQUENCY TRANSCEIVER AND BASE STATION

(71) Applicant: Huawei Technologies Co., Ltd., Shenzhen (CN)

(72) Inventors: Jinsong Lv, Shanghai (CN); Honggang Xu, Shanghai (CN); Jueping Wang, Shanghai (CN); Tao Pu, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 149 days.

(21) Appl. No.: 15/180,687

(22) Filed: Jun. 13, 2016

(65) Prior Publication Data
US 2016/0285480 A1    Sep. 29, 2016

Related U.S. Application Data

(63) Continuation of application No. PCT/CN2013/089338, filed on Dec. 13, 2013.

(51) Int. Cl.
*H04B 1/00* (2006.01)
*H04J 1/08* (2006.01)
*H04W 88/10* (2009.01)

(52) U.S. Cl.
CPC ........... *H04B 1/0057* (2013.01); *H04J 1/08* (2013.01); *H04W 88/10* (2013.01)

(58) Field of Classification Search
CPC .................. H04B 1/0057; H04J 1/08
See application file for complete search history.

(56) References Cited

U.S. PATENT DOCUMENTS

| | | | | |
|---|---|---|---|---|
| 2001/0012788 A1* | 8/2001 | Gammon | ............... | H01Q 1/246 455/562.1 |
| 2005/0245202 A1* | 11/2005 | Ranta | ...................... | H03J 5/244 455/78 |
| 2006/0240785 A1 | 10/2006 | Fischer | | |
| 2008/0225971 A1 | 9/2008 | Behzad | | |
| 2010/0074240 A1* | 3/2010 | Jian | ...................... | H04B 1/0057 370/339 |
| 2011/0110452 A1* | 5/2011 | Fukamachi | ......... | H01P 1/20336 375/267 |
| 2012/0157013 A1 | 6/2012 | Wu et al. | | |
| 2014/0003300 A1* | 1/2014 | Weissman | ............ | H04B 1/0064 370/273 |

(Continued)

FOREIGN PATENT DOCUMENTS

| | | |
|---|---|---|
| CN | 1913379 A | 2/2007 |
| CN | 101316105 A | 12/2008 |
| CN | 101534141 A | 9/2009 |

(Continued)

*Primary Examiner* — Brandon M Renner
*Assistant Examiner* — Jay L Vogel
(74) *Attorney, Agent, or Firm* — Slater Matsil, LLP

(57) ABSTRACT

Embodiments disclose a multi-frequency transceiver and a base station. The multi-frequency transceiver is connected to an antenna, and includes: at least one transmit multiplexer, where each transmit multiplexer includes multiple transmit paths, and each transmit path is used to transmit one frequency band by using the antenna; and at least one receive multiplexer, where each receive multiplexer includes multiple receive paths, and each receive path is used to receive one frequency band by using the antenna.

10 Claims, 4 Drawing Sheets

(56) References Cited

U.S. PATENT DOCUMENTS

2014/0036777 A1* 2/2014 Kokkinos .............. H01Q 1/246
370/328

FOREIGN PATENT DOCUMENTS

| | | |
|---|---|---|
| CN | 201479381 U | 5/2010 |
| CN | 102104392 A | 6/2011 |
| CN | 103444088 A | 12/2013 |
| EP | 1537677 A1 | 6/2005 |
| EP | 2421174 A1 | 2/2012 |
| EP | 2487800 A1 | 8/2012 |

* cited by examiner

MULTI-FREQUENCY TRANSCEIVER AND BASE STATION

CROSS-REFERENCE TO RELATED APPLICATIONS

This application is a continuation of International Application No. PCT/CN2013/089338, filed on Dec. 13, 2013, which is hereby incorporated by reference in its entirety.

TECHNICAL FIELD

The present invention relates to the field of wireless communications, and in particular, to a multi-frequency transceiver and a base station.

BACKGROUND

With the development of broadband multi-frequency technologies, one transceiver of a base station can support multiple frequency bands. In the prior art, a traditional transceiver duplex apparatus is used to perform receiving and transmitting processing in the multiple frequency bands. 2T4R (T represents transmitting, and R represents receiving) in three frequency bands 1800, 2100, and 2600 is used as an example. It can be known from FIG. 1a that, to implement the function of 2T4R, four multiplexers are disposed in a transceiver of a base station, which are a sixplexer, a triplexer, a triplexer, and a sixplexer from top to bottom, where the two sixplexers may be configured to receive and transmit radio frequency signals in different frequency bands simultaneously. In the prior art, channel arrangement of the two sixplexers is as follows: 1800RX (used to receive a signal in the 1800 frequency band), 1800TX (used to transmit a signal in the 1800 frequency band), 2100RX (used to receive a signal in the 2100 frequency band), 2100TX (used to transmit a signal in the 2100 frequency band), 2600RX (used to receive a signal in the 2600 frequency band), and 2600TX (used to transmit a signal in the 2600 frequency band). Further, as shown in FIG. 1a, the four multiplexers of a transceiver module of the base station are respectively connected to four ports (which are separately ANT1, ANT2, ANT3, and ANT4 in FIG. 1a) of an antenna, so as to implement signal receiving and transmitting in different array directions of the antenna. Further, referring to FIG. 1b, the antenna is represented by an antenna plane, where each "x" in FIG. 1b represents two polarization directions of one column of antennas. Four small blocks below the antenna plane in FIG. 1b are separately corresponding to ANT1, ANT2, ANT3, and ANT4 in FIG. 1a. T/R1 in FIG. 1b represents a receive and transmit interface of the sixplexer that is in FIG. 1a and that is connected to ANT1, and six arrows under T/R1 represent receive and transmit frequency bands (which are arranged as: 1800RX-1800TX-2100RX-2100TX-2600RX-2600TX) of the sixplexer. R3 in FIG. 1b represents a receive interface of the triplexer that is in FIG. 1a and that is connected to ANT2, and arrows under R3 represent receive frequency bands (which are arranged as: 1800RX-2100RX-2600RX) of the triplexer. R4 in FIG. 1b represents a receive interface of the triplexer that is in FIG. 1a and that is connected to ANT3, and arrows under R4 represent receive frequency bands (which are arranged as: 1800RX-2100RX-2600RX) of the triplexer. T/R2 in FIG. 1b represents a receive and transmit interface of the sixplexer that is in FIG. 1a and that is connected to ANT4, and six arrows under T/R2 represent receive and transmit frequency bands (which are arranged as: 1800RX-1800TX-2100RX-2100TX-2600RX-2600TX) of the sixplexer. In the prior art, receiving and transmitting in all frequency bands of a base station are implemented by using a multiplexer. Because receiving and transmitting in a same frequency band and receiving and transmitting in different frequency bands are integrated and a requirement for separation between receiving and transmitting is relatively high, a great difficulty is brought to multiplexer design.

SUMMARY

In view of this, the present invention provides a multi-frequency transceiver and a base station, which can reduce a difficulty of a design technology of a multiplexer.

A first aspect of the embodiments provides a multi-frequency transceiver, connected to an antenna. The transceiver may include at least one transmit multiplexer, where each transmit multiplexer includes multiple transmit paths, and each transmit path is used to transmit a signal in one frequency band by using the antenna. The transceiver may also include at least one receive multiplexer, where each receive multiplexer includes multiple receive paths, and each receive path is used to receive a signal in one frequency band by using the antenna.

With reference to the first aspect, in a first feasible implementation manner, each transmit multiplexer includes a transmit path of each frequency band in N frequency bands, and each receive multiplexer includes a receive path of each frequency band in the N frequency bands, where N is a positive integer greater than or equal to 2.

With reference to the first feasible implementation manner of the first aspect, in a second feasible implementation manner, the at least one transmit multiplexer includes two transmit multiplexers, and each transmit multiplexer includes a transmit path of each frequency band in three frequency bands; and the at least one receive multiplexer includes four receive multiplexers, and each receive multiplexer includes a receive path of each frequency band in the three frequency bands.

A second aspect of the embodiments provides a multi-frequency transceiver, where the multi-frequency transceiver is connected to an antenna and includes multiple multiplexers. Each multiplexer includes: a single transmit path, used to transmit a signal in one frequency band by using the antenna; and at least one receive path, where each receive path is used to receive a signal in one frequency band by using the antenna.

With reference to the second aspect, in a first feasible implementation manner, a frequency band transmitted by the transmit path is the same as a frequency band received by a receive path in the at least one receive path.

With reference to the second aspect, in a second feasible implementation manner, a frequency band transmitted by the transmit path is different from a frequency band received by any receive path in the at least one receive path.

With reference to the first or second feasible implementation manner of the second aspect, in a third possible feasible implementation manner, a frequency band received by each receive path is different from a frequency band received by any other receive path in the at least one receive path.

With reference to the third feasible implementation manner of the second aspect, in a fourth feasible implementation manner, the multiple multiplexers include at least N multiplexers, in each multiplexer of the N multiplexers, a frequency band transmitted by a transmit path is one of N frequency bands, each receive path is one of the N frequency bands, and a frequency band transmitted by a transmit path in each multiplexer is different from a frequency band transmitted by a transmit path in any other multiplexer in the N multiplexers, where N is a positive integer greater than or equal to 2.

With reference to the fourth feasible implementation manner of the second aspect, in a fifth feasible implementation manner, the N multiplexers include at least M multiplexers, and each multiplexer in the M multiplexers includes a same quantity of receive paths, where M is a positive integer less than N.

With reference to the fourth feasible implementation manner of the second aspect, in a sixth feasible implementation manner, the N multiplexers include at least one multiplexer in which a quantity of receive paths is different from a quantity of receive paths in another at least one multiplexer in the N multiplexers.

With reference to the fourth feasible implementation manner of the second aspect, in a seventh feasible implementation manner, in the N multiplexers, a total quantity of receive paths that receive any frequency band in the N frequency bands is the same.

With reference to the fourth feasible implementation manner of the second aspect, in an eighth feasible implementation manner, the N frequency bands include at least one frequency band, a total quantity of receive paths that receive the frequency band in the N multiplexers is different from a total quantity of receive paths that receive another frequency band in the N frequency bands in the N multiplexers.

A third aspect of the embodiments provides a base station, including any multi-frequency transceiver according to the first aspect, the first and the second feasible implementation manners of the first aspect, the second aspect, and the first to the eighth feasible implementation manners of the second aspect.

A third aspect of the embodiments provides a base station, where the base station may include the multi-frequency transceiver described in the embodiments.

It can be learned from the above that, in some feasible implementation manners of the present invention, a multiplexer used in a multi-frequency transceiver is configured to only transmit a signal in each frequency band supported by the multi-frequency transceiver, or is configured to only receive a signal in each frequency band supported by the multi-frequency transceiver, or is configured to only transmit a signal in one frequency band of the multi-frequency transceiver and receive signals (which include or do not include a signal that is in a same frequency band as the transmitted signal) in multiple frequency bands supported by the multi-frequency transceiver. In this way, in embodiments of the present invention, an impact on a receive path of a frequency band by a transmit path of a neighboring frequency band can be eliminated, a requirement for suppression of a filter of a multiplexer is reduced, and reducing of the suppression can reduce an insertion loss of the multiplexer, especially an insertion loss of an edge of the multiplexer, so that a difficulty of multiplexer design is reduced. Separation between receiving and transmitting by using different multiplexers can reduce an intermodulation requirement on an antenna. In addition, when there is transmission of only one frequency band on each multiplexer, transmission in each frequency band can be electrically tilted independently.

BRIEF DESCRIPTION OF THE DRAWINGS

FIG. 1b is a schematic diagram of a correspondence between a multiplexer and an antenna port that are of the transceiver in FIG. 1a;

FIG. 2b is a schematic diagram of a correspondence between a multiplexer and an antenna port that are of the multi-frequency transceiver in FIG. 2a;

FIG. 3b is a schematic diagram of a correspondence between a multiplexer and an antenna port that are of the multi-frequency transceiver in FIG. 3a;

FIG. 4b is a schematic diagram of a correspondence between a multiplexer and an antenna port that are of the multi-frequency transceiver in FIG. 4a.

DETAILED DESCRIPTION OF ILLUSTRATIVE EMBODIMENTS

An embodiment provides a first multi-frequency transceiver, where the multi-frequency transceiver is connected to an antenna and may include: at least one transmit multiplexer, where each transmit multiplexer includes multiple transmit paths, and each transmit path is used to transmit a signal in one frequency band by using the antenna; and at least one receive multiplexer, where each receive multiplexer includes multiple receive paths, and each receive path is used to receive a signal in one frequency band by using the antenna.

In some feasible implementation manners, each transmit multiplexer includes a transmit path of each frequency band in N frequency bands, and each receive multiplexer includes a receive path of each frequency band in the N frequency bands, where N is a positive integer greater than or equal to 2. For example, N may be 3, and the three frequency bands may be 1800, 2100, and 2600 separately. In this way, each transmit multiplexer includes transmit paths of the 1800, 2100, and 2600 frequency bands, and each receive multiplexer includes receive paths of the 1800, 2100, and 2600 frequency bands.

In some feasible implementation manners, the at least one transmit multiplexer includes two transmit multiplexers, and each transmit multiplexer includes a transmit path of each frequency band in three frequency bands; and the at least one receive multiplexer includes four receive multiplexers, and each receive multiplexer includes a receive path of each frequency band in the three frequency bands. Corresponding to the three frequency bands 1800, 2100, and 2600, each transmit multiplexer of the two transmit multiplexers may include a 1800 transmit path (1800TX), a 2100 transmit path (2100TX), and a 2600 transmit path (2600TX). Each receive multiplexer of the four receive multiplexers includes a 1800 receive path (1800RX), a 2100 receive path (2100RX), and a 2600 receive path (2600RX). A person skilled in the art should understand that, in a specific implementation process, quantities of transmit multiplexers and receive multiplexers that are in a multi-frequency transceiver may be set according to a specific requirement (for example, a quantity of frequency bands that need to be supported, and quantities of transmit paths and receive paths that are in each frequency band).

The following exemplarily describes a compositional structure of the first multi-frequency transceiver of the present invention by using the accompanying drawings and a specific embodiment.

Figure 2A:
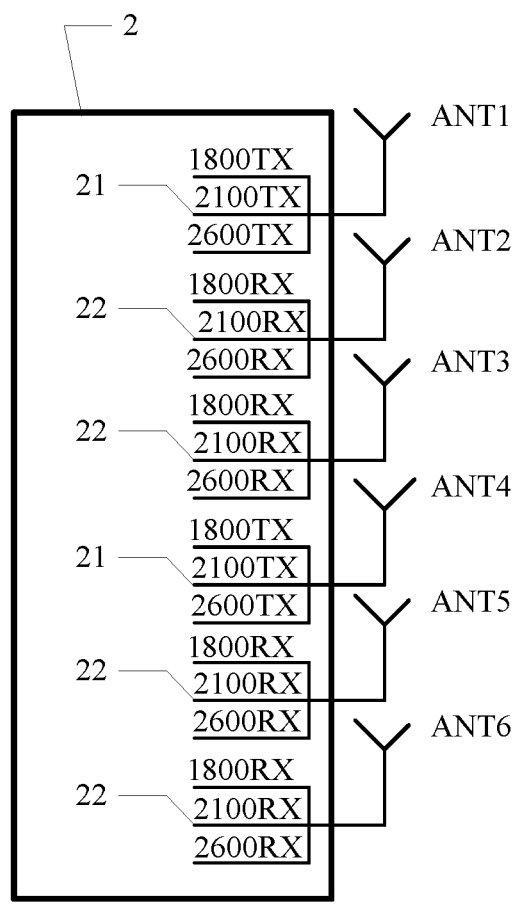
FIG. 2a is a schematic diagram of a compositional structure of an embodiment of a multi-frequency transceiver according to the embodiments.

FIG. 2a is a schematic diagram of a compositional structure of an embodiment of a multi-frequency transceiver. In specific implementation, a multi-frequency transceiver 2 in this embodiment may include m1 transmit multiplexers 21 and n1 receive multiplexers 22 (where m1 and n1 are positive integers, and for ease of subsequent description, in FIG. 2a, a value of m1 is 2 and a value of n1 is 4), and each transmit multiplexer 21 or each receive multiplexer 22 is connected to one port (the port is ANT1, . . . , ANTN in FIG. 2a, where N is m1+n1, and when the value of m1 is 2 and the value of n1 is 4, a value of N in FIG. 2a is 6) of an antenna, so as to receive or transmit a radio frequency signal in each frequency band in different array directions of the antenna. m1 and n1 enables the multi-frequency transceiver 2 to implement an architecture of m1Tn1R (which indicates that the multi-frequency transceiver 2 can implement m1 transmit channels and n1 receive channels). Further, as shown in FIG. 2a, both the transmit multiplexer 21 and the receive multiplexer 22 may be k1-plexers, where k1 represents a quantity of frequency bands that are supported by the multi-frequency transceiver 2, for example, k1 may be 3, 4, or another value. In specific implementation, a specific frequency band supported by the multi-frequency transceiver in this embodiment may be determined according to a network requirement. For ease of description, in FIG. 2a, an example in which a value of k1 is 3, and the three frequency bands may be 1800, 2100, and 2600 separately is used.

In specific implementation, the transmit multiplexer 21 in this embodiment includes multiple transmit paths, and each transmit path is used to transmit one frequency band by using the antenna. For example, when the value of k1 is 3 and supported frequency bands are 1800, 2100, and 2600, the transmit multiplexer 21 includes three transmit paths, and the three transmit paths respectively transmit signals in the three frequency bands 1800, 2100, and 2600. The receive multiplexer 22 includes multiple receive paths, and each receive path is used to receive one frequency band by using the antenna. For example, when the value of k1 is 3 and supported frequency bands are 1800, 2100, and 2600, the receive multiplexer 22 includes three receive paths, and the three receive paths respectively receive signals in the three frequency bands 1800, 2100, and 2600. In specific implementation, a 1800 receive frequency band is generally frequencies of 1710-1785, a 1800 transmit frequency band is generally frequencies of 1805-1880, a 2100 receive frequency band is generally frequencies of 1920-1980, a 2100 transmit frequency band is generally frequencies of 2110-2170, a 2600 receive frequency band is generally frequencies of 2500-2570, and a 2600 transmit frequency band is generally frequencies of 2620-2690.

Figure 1A:
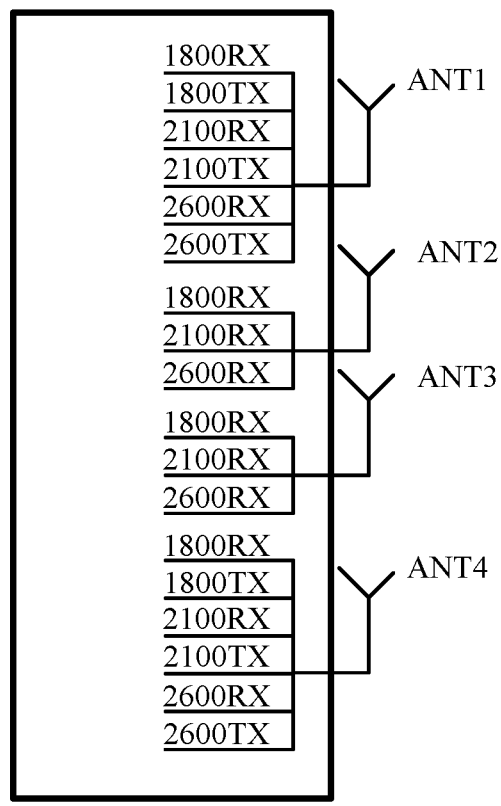
FIG. 1a is a schematic diagram of a compositional structure of an existing transceiver.
Figure 1B:
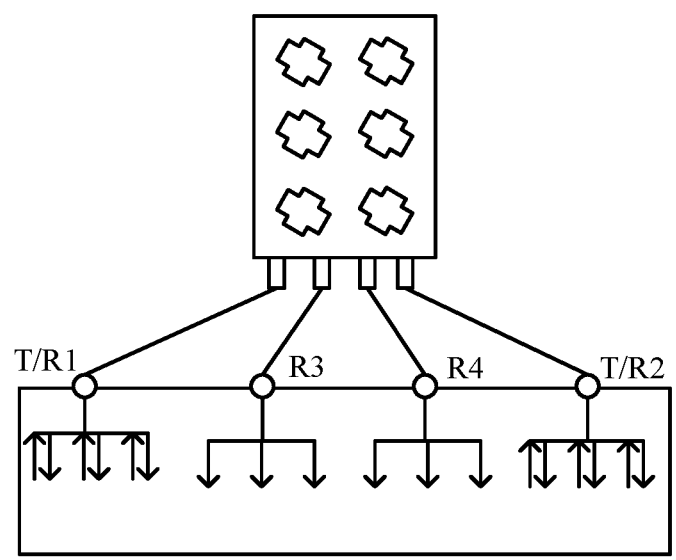
Figure 2B:
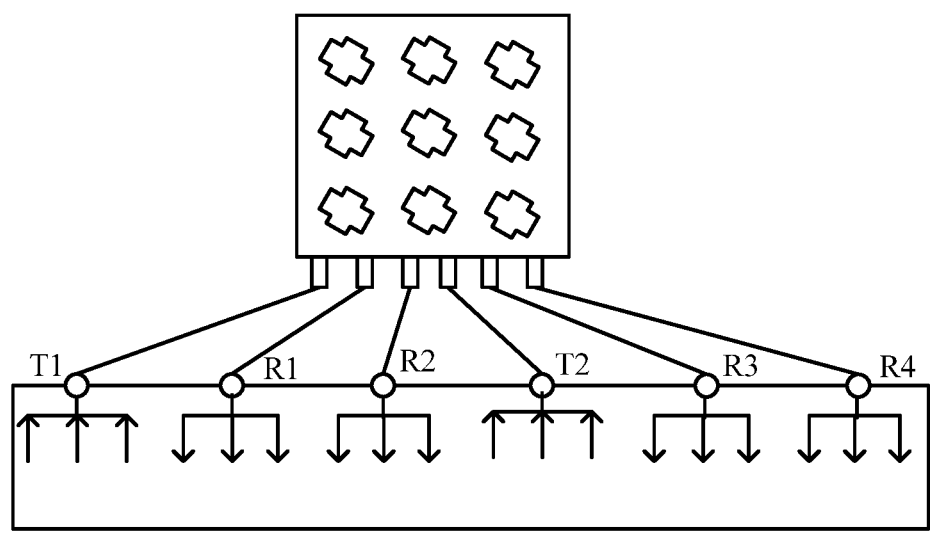

Further, FIG. 2b is another representation manner of the architecture of FIG. 2a. In FIG. 2b, an antenna is represented by an antenna plane, and each "x" in FIG. 2b represents two polarization directions of one column of antennas, and small blocks below the antenna plane in FIG. 2b are respectively ports ANT1, . . . , ANTN of the antenna. For ease of description, in FIG. 2b, a value of N is 6 and the value of k1 is 3. T1 in FIG. 2b represents a transmit interface of a triplexer that is in FIG. 2a and that is connected to ANT1, and three arrows under T1 represent transmit frequency bands (which are arranged as: 1800TX-2100TX-2600TX) of the triplexer. R1 in FIG. 2b represents a receive interface of a triplexer that is in FIG. 2a and that is connected to ANT2, and arrows under R1 represent receive frequency bands (which are arranged as: 1800RX-2100RX-2600RX) of the triplexer. R2 in FIG. 2b represents a receive interface of a triplexer that is in FIG. 2a and that is connected to ANT3, and arrows under R2 represent receive frequency bands (which are arranged as: 1800RX-2100RX-2600RX) of the triplexer. T2 in FIG. 2b represents a transmit interface of a triplexer that is in FIG. 2a and that is connected to ANT4, and three arrows under T2 represent transmit frequency bands (which are arranged as: 1800TX-2100TX-2600TX) of the triplexer. R3 in FIG. 2b represents a receive interface of a triplexer that is in FIG. 2a and that is connected to ANT5, and three arrows under R3 represent receive frequency bands (which are arranged as: 1800RX-2100RX-2600RX) of the triplexer. R4 in FIG. 2b represents a receive interface of a triplexer that is in FIG. 2a and that is connected to ANTE, and three arrows under R4 represent receive frequency bands (which are arranged as: 1800RX-2100RX-2600RX) of the triplexer. It should be noted that, FIG. 2a and FIG. 2b are a structure of 2T4R of a multi-frequency transceiver in which m1 is 2, n1 is 4, and k1 is 3. In specific implementation, according to different values of m1, n1, and k1, quantities of transmit multiplexers and receive multiplexers that are included in the multi-frequency transceiver may be different, and quantities of frequency bands that are specifically transmitted by the transmit multiplexer or received by the receive multiplexer are also different. However, the embodiment shown in FIG. 2a and FIG. 2b shows a technical solution in which multi-frequency transmitting and multi-frequency receiving are totally separated by using different multiplexers. It can be known from FIG. 2b that, because the multi-frequency transceiver in this embodiment totally separates receiving and transmitting of signals in multiple frequency bands by using different multiplexers, in this way, an interval between frequency band signals on each multiplexer is increased. For example, for three frequency bands 1800, 2100, and 2600, in specific implementation, a 1800 receive frequency band is generally frequencies of 1710-1785, a 1800 transmit frequency band is generally frequencies of 1805-1880, a 2100 receive frequency band is generally frequencies of 1920-1980, a 2100 transmit frequency band is generally frequencies of 2110-2170, a 2600 receive frequency band is generally frequencies of 2500-2570, and a 2600 transmit frequency band is generally frequencies of 2620-2690. Therefore, when the multi-frequency transceiver shown in FIG. 2a of this embodiment of the present invention is used to separate a receive frequency band and a transmit frequency band, compared with a solution in the prior art that receiving and transmitting of a same frequency band and receiving and transmitting of different frequency bands are all integrated, an interval between frequency bands on each multiplexer of a transceiver is increased (to be specific: an interval between frequency bands of each multiplexer in FIG. 2b is larger than that in FIG. 1b). Therefore, the multi-frequency transceiver shown in FIG. 2a of this embodiment of the present invention reduces a requirement for suppression of a transceiver filter channel of a multiplexer. In addition, because a frequency interval between frequency bands transmitted or frequency bands received on a same multiplexer is enlarged, a quantity of cavities of a filter of the multiplexer may be reduced, which facilitates multiplexer miniaturization, and in this way, an accompanying insertion loss is also reduced. In addition, after receiving and transmitting are separated, an intermodulation requirement on an antenna is also reduced, and a performance requirement on a multi-antenna of a multi-frequency transceiver is also reduced, so that costs of an antenna that is used are also reduced.

An embodiment further provides a second multi-frequency transceiver, which is connected to an antenna and includes multiple multiplexers. Each multiplexer includes: a single transmit path, used to transmit a signal in one frequency band by using the antenna; and at least one receive path, where each receive path is used to receive a signal in one frequency band by using the antenna. It can be easily understood that, each multiplexer included in the second multi-frequency transceiver includes both a transmit path and a receive path, and therefore, this type of multiplexer may be called a transceiver multiplexer.

In some feasible implementation manners, a frequency band transmitted by the transmit path is the same as a frequency band received by a receive path in the at least one receive path. For example, both a transmit path and a receive path that are of a 1800 frequency band may be set in one multiplexer. In this case, the multiplexer may include only the transmit path and the receive path that are of the 1800 frequency band, or a receive path of another frequency band may be set in the multiplexer, for example, a receive path of a 2100 frequency band. A person skilled in the art should understand that, although both the transmit path and the receive path that are of the 1800 frequency band are set in the multiplexer, frequency ranges of the transmit path and the receive path are different. For example, a frequency range of the transmit path in the 1800 frequency band is 1805-1880, and the receive frequency band is generally 1710-1785.

In some feasible implementation manners, a frequency band transmitted by the transmit path is different from a frequency band received by any receive path in the at least one receive path. For example, in addition to a transmit path of an 1800 frequency band, receive paths of a 2100 frequency band and a 2600 frequency band may also be set in one multiplexer.

In some feasible implementation manners, a frequency band received by each receive path is different from a frequency band received by any other receive path in the at least one receive path. For example, in addition to a receive path of an 1800 frequency band, a receive path of a 2100 frequency band and a receive path of a 2600 frequency band may also be separately set in one multiplexer.

In some feasible implementation manners, the multiple multiplexers include at least N multiplexers, in each multiplexer of the N multiplexers, a frequency band transmitted by a transmit path is one of N frequency bands, each receive path is one of the N frequency bands, and a frequency band transmitted by a transmit path in each multiplexer is different from a frequency band transmitted by a transmit path in any other multiplexer in the N multiplexers, where N is a positive integer greater than or equal to 2. For example, to implement receiving and transmitting of three frequency bands 1800, 2100, and 2600, three multiplexers may be set. A transmit path of the 1800 frequency band and receive paths of the 2100 and 2600 frequency bands are set in a first multiplexer. A transmit path of the 2100 frequency band and receive paths of the 1800 and 2600 frequency bands are set in a second multiplexer. A transmit path of the 2600 frequency band and receive paths of the 1800 and 2100 frequency bands are set in a third multiplexer.

In some feasible implementation manners, the N multiplexers include at least M multiplexers, and each multiplexer in the M multiplexer includes a same quantity of receive paths, where M is a positive integer less than N. For example, to implement receiving and transmitting of three frequency bands 1800, 2100, and 2600, three multiplexers may be set. A transmit path of the 1800 frequency band and receive paths of the 2100 and 2600 frequency bands are set in a first multiplexer. A transmit path of the 2100 frequency band and receive paths of the 1800 and 2600 frequency bands are set in a second multiplexer. A transmit path of the 2600 frequency band and receive paths of the 1800 and 2100 frequency bands are set in a third multiplexer. In this case, each multiplexer includes two receive paths.

In some feasible implementation manners, the N multiplexers include at least one multiplexer in which a quantity of receive paths is different from a quantity of receive paths in another at least one multiplexer in the N multiplexers. For example, to implement receiving and transmitting of three frequency bands 1800, 2100, and 2600, three multiplexers may be set. A transmit path of the 1800 frequency band and a receive path of the 2100 frequency band are set in a first multiplexer. A transmit path of the 2100 frequency band and receive paths of the 1800 and 2600 frequency bands are set in a second multiplexer. A transmit path of the 2600 frequency band and a receive path of the 1800 frequency band are set in a third multiplexer.

In some feasible implementation manners, in the N multiplexers, a total quantity of receive paths that receive any frequency band in the N frequency bands is the same. For example, to implement receiving and transmitting of three frequency bands 1800, 2100, and 2600, three multiplexers may be set. A transmit path of the 1800 frequency band and receive paths of the 2100 and 2600 frequency bands are set in a first multiplexer. A transmit path of the 2100 frequency band and receive paths of the 1800 and 2600 frequency bands are set in a second multiplexer. A transmit path of the 2600 frequency band and receive paths of the 1800 and 2100 frequency bands are set in a third multiplexer. In this case, in a transceiver that includes the foregoing three multiplexers, total quantities of receive paths of the 1800, 2100, and 2600 frequency bands are all two.

In some feasible implementation manners, the N frequency bands include at least one frequency band, a total quantity of receive paths that receive the frequency band in the N multiplexers is different from a total quantity of receive paths that receive another frequency band in the N frequency bands in the N multiplexers. For example, to implement receiving and transmitting of three frequency bands 1800, 2100, and 2600, three multiplexers may be set. A transmit path of the 1800 frequency band and a receive path of the 2100 frequency band are set in a first multiplexer. A transmit path of the 2100 frequency band and receive paths of the 1800 and 2600 frequency bands are set in a second multiplexer. A transmit path of the 2600 frequency band and a receive path of the 1800 frequency band are set in a third multiplexer. Therefore, in a transceiver that includes the foregoing three multiplexers, there are two receive paths of 1800, one receive path of the 2100 frequency band, and one receive path of the 2600 frequency band. A person skilled in the art should understand that, in a specific implementation process, a quantity of transceiver multiplexers in a multi-frequency transceiver may be set according to a specific requirement (for example, a quantity of frequency bands that need to be supported, and quantities of transmit paths and receive paths that are in each frequency band).

The following exemplarily describes a compositional structure of the second multi-frequency transceiver by using the accompanying drawings and a specific embodiment.

Figure 3A:
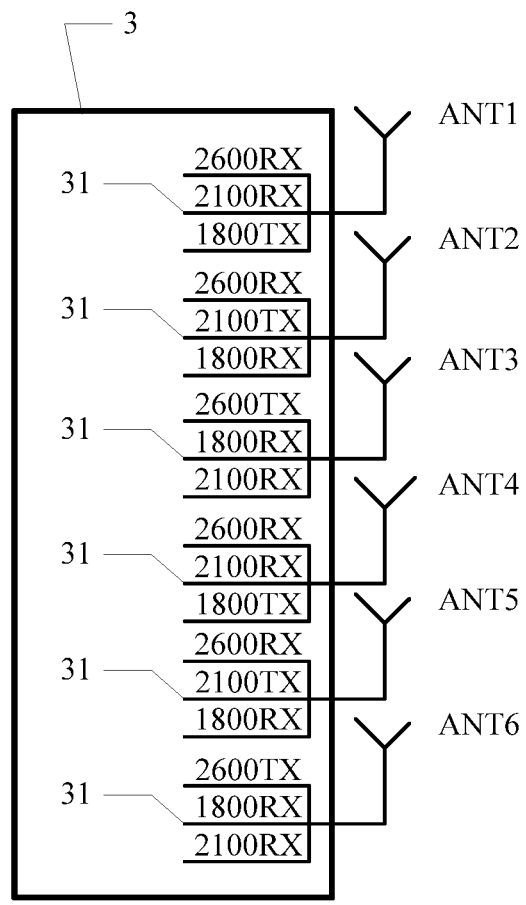
FIG. 3a is a schematic diagram of a compositional structure of an embodiment of a multi-frequency transceiver according to the embodiments.

FIG. 3a is a schematic diagram of a compositional structure of another embodiment of a multi-frequency transceiver. In specific implementation, a multi-frequency transceiver 3 in this embodiment of the present invention may include m2 transceiver multiplexers 31 (where m2 is a positive integer and represents a quantity of connected channels between a multiplexer and an antenna array, and for ease of subsequent description, in FIG. 3a, a value of m2 is 6), and each transceiver multiplexer 31 is connected to a port (ANT1, . . . , ANTN in FIG. 3a, where N=m2) of an antenna, so as to receive or transmit a radio frequency signal in each frequency band in different array directions of the antenna. Further, as shown in FIG. 3a, all the transceiver multiplexers 31 may be k2-plexers, where k2 represents all frequency bands that are supported by the multi-frequency transceiver 3, for example, k2 may be 3, 4, or another value. In specific implementation, a specific frequency band supported by the multi-frequency transceiver in this embodiment may be determined according to a network requirement. For ease of description, in FIG. 3a, an example in which a value of k2 is 3, and the three frequency bands may be 1800, 2100, and 2600 separately is used.

In specific implementation, the transceiver multiplexer 31 in this embodiment may include a single transmit path, which is used to transmit one frequency band by using the antenna, and meanwhile, the transceiver multiplexer 31 further includes at least one receive path, where each receive path is used to receive one frequency band by using the antenna, and in this embodiment, the frequency band received by the transceiver multiplexer 31 and the transmitted frequency band are different frequency bands. For example, when the value of k2 is 3 and the supported frequency bands are 1800, 2100, and 2600, the transceiver multiplexer 31 includes a transmit path used to transmit a signal in the 1800 frequency band, and further includes receive paths that receive signals in the 2100 frequency band and the 2600 frequency band; or the transceiver multiplexer 31 may include a transmit path used to transmit a signal in the 2100 frequency band, and further include receive paths that receive signals in the 1800 frequency band and the 2600 frequency band; or the transceiver multiplexer 31 may include a transmit path used to transmit a signal in the 2600 frequency band, and further include receive paths that receive signals in the 2100 frequency band and the 1800 frequency band. Specifically, reference may be made to FIG. 3a. When the value of m2 is 6, the six transceiver multiplexers 31 may be classified into three multiplexer groups, and each multiplexer group includes two multiplexers. A transceiver multiplexer 31 connected to an antenna port ANT1 and a transceiver multiplexer 31 connected to an antenna port ANT4 are a first group, and receive and transmit frequency bands of the first group of transceiver multiplexers 31 are arranged as: 2600RX-2100RX-1800TX. A transceiver multiplexer 31 connected to an antenna port ANT2 and a transceiver multiplexer 31 connected to an antenna port ANT5 are a second group, and receive and transmit frequency bands of the second group of transceiver multiplexers 31 are arranged as: 2600RX-2100TX-1800RX. A transceiver multiplexer 31 connected to an antenna port ANT3 and a transceiver multiplexer 31 connected to an antenna port ANTE are a third group, and receive and transmit frequency bands of the third group of transceiver multiplexers 31 are arranged as: 2600TX-1800RX-2100RX. In addition, in this embodiment, each multiplexer includes a same quantity of receive paths. In addition, total quantities of receive paths of all frequency bands are the same.

Figure 3B:
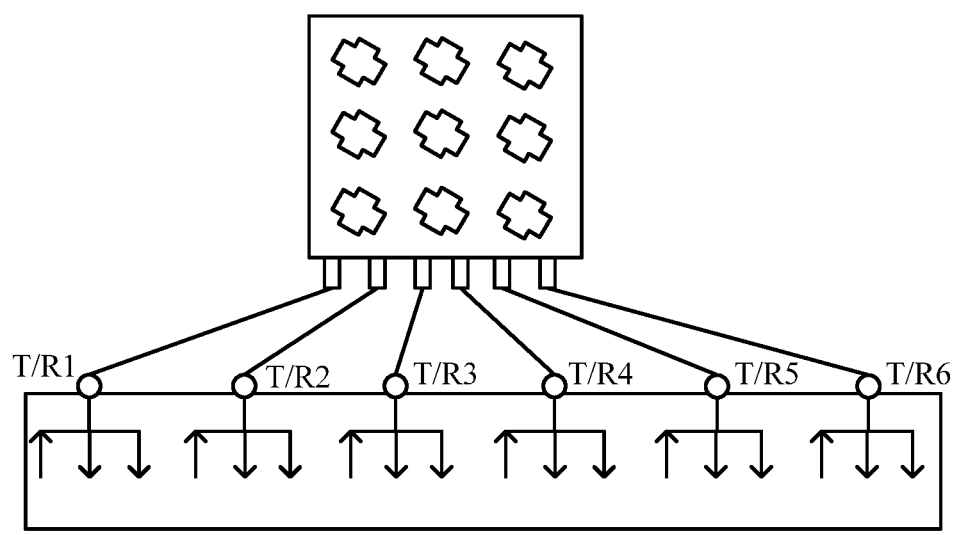

Further, FIG. 3b is another representation manner of the architecture of FIG. 3a. In FIG. 3b, an antenna is represented by an antenna plane, and each "x" in FIG. 3b represents two polarization directions of one column of antennas, and small blocks below the antenna plane in FIG. 3b are respectively ports ANT1, . . . , ANTN of the antenna. For ease of description, in FIG. 3b, a value of N is 6 and the value of k2 is 3. T/R1 in FIG. 3b represents a receive and transmit interface of a triplexer that is in FIG. 3a and that is connected to ANT1, and three arrows under T/R1 represent receive and transmit frequency bands (which are arranged as: 2600RX-2100RX-1800TX) of the triplexer. T/R2 in FIG. 3b represents a receive and transmit interface of a triplexer that is in FIG. 3a and that is connected to ANT2, and arrows under T/R2 represent receive and transmit frequency bands (which are arranged as: 2600RX-2100TX-1800RX) of the triplexer. T/R3 in FIG. 3b represents a receive and transmit interface of a triplexer that is in FIG. 3a and that is connected to ANT3, and arrows under T/R3 represent receive and transmit frequency bands (which are arranged as: 2600TX-1800RX-2100RX) of the triplexer. T/R4 in FIG. 3b represents a receive and transmit interface of a triplexer that is in FIG. 3a and that is connected to ANT4, and three arrows under T/R4 represent receive and transmit frequency bands (which are arranged as: 2600RX-2100RX-1800TX) of the triplexer. T/R5 in FIG. 3b represents a receive and transmit interface of a triplexer that is in FIG. 3a and that is connected to ANT5, and arrows under T/R5 represent receive and transmit frequency bands (which are arranged as: 2600RX-2100TX-1800RX) of the triplexer. T/R6 in FIG. 3b represents a receive and transmit interface of a triplexer that is in FIG. 3a and that is connected to ANTE, and arrows under T/R6 represent receive and transmit frequency bands (which are arranged as: 2600TX-1800RX-2100RX) of the triplexer. It should be noted that, FIG. 3a and FIG. 3b are a structure of a multi-frequency transceiver by using an example in which m2 is 6 and k2 is 3. In specific implementation, according to different values of m2 and k2, a quantity of transceiver multiplexers included in the multi-frequency transceiver may be different, and quantities of frequencies that are specifically transmitted and received by each transceiver multiplexer are also different. However, the embodiment shown in FIG. 3a shows that a transmit frequency and a receive frequency that are of a multiplexer are set in an inter-frequency manner, and an interval between frequencies on each multiplexer is increased, and therefore, when the multi-frequency transceiver shown in FIG. 3a of this embodiment of the present invention is used, compared with a solution in the prior art that receiving and transmitting of a same frequency band and receiving and transmitting of different frequency bands are all integrated, an interval between frequency bands on each multiplexers is increased (to be specific: an interval between frequency bands of each multiplexer in FIG. 3b is larger than that in FIG. 1b). Therefore, the multi-frequency transceiver shown in FIG. 3a of this embodiment of the present invention reduces a requirement for suppression of a transceiver filter channel of a multiplexer. In addition, because a frequency interval between frequency bands transmitted or frequency bands received on a same multiplexer is enlarged, a quantity of cavities of a filter of the multiplexer may be reduced, which facilitates multiplexer miniaturization, and in this way, an accompanying insertion loss is also reduced. In addition, after receiving and transmitting are separated, an intermodulation requirement on an antenna is also reduced, and a performance requirement on a multi-antenna of a multi-frequency transceiver is also reduced, so that costs of an antenna that is used are also reduced.

Figure 4A:
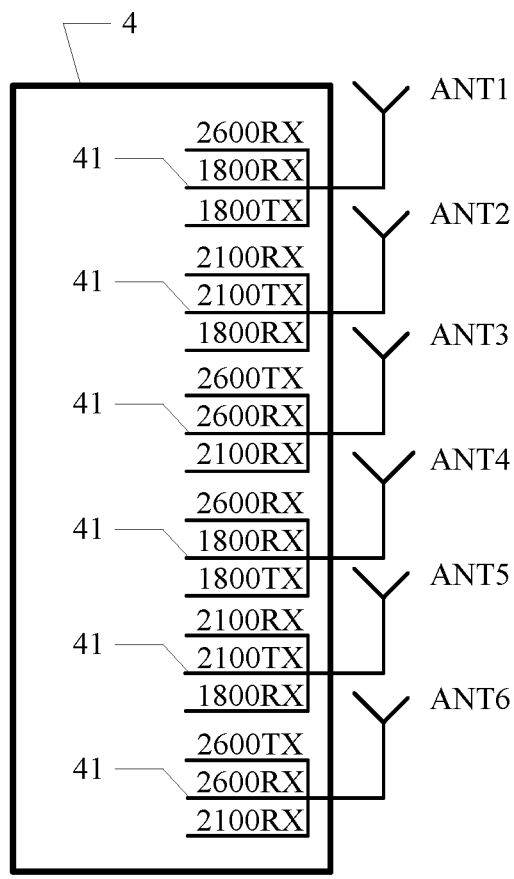
FIG. 4a is a schematic diagram of a compositional structure of an embodiment of a multi-frequency transceiver according to the embodiments.

FIG. 4a is a schematic diagram of a compositional structure of another embodiment of a multi-frequency transceiver. In specific implementation, a multi-frequency transceiver 4 in this embodiment of the present invention may include m3 transceiver multiplexers 41 (where m3 is a positive integer, and represents a quantity of connected channels between a multiplexer and an antenna array, and for ease of subsequent description, in FIG. 4a, a value of m3 is 6), and each transceiver multiplexer 41 is connected to a port (ANT1, . . . , ANTN in FIG. 4a, where N=m3 ) of an antenna, so as to receive or transmit a radio frequency signal in each frequency band in different array directions of the antenna. Further, as shown in FIG. 4a, all the transceiver multiplexers 41 may be kb-plexers, where k3 represents all frequency bands that are supported by the multi-frequency transceiver 4, for example, k3 may be 3, 4, or another value. In specific implementation, a specific frequency band supported by the multi-frequency transceiver in this embodiment of the present invention may be determined according to a network requirement. For ease of description, in FIG. 4a, an example in which a value of k3 is 3, and the three frequency bands may be 1800, 2100, and 2600 separately is used.

In specific implementation, the transceiver multiplexer 41 in this embodiment of the present invention may include a single transmit path, which is used to transmit one frequency band by using the antenna, and meanwhile, the transceiver multiplexer 41 further includes at least one receive path, where each receive path is used to receive one frequency band by using the antenna. In this embodiment, the frequency band received by the transceiver multiplexer 41 includes a signal that is in a same frequency band as the transmitted frequency band and a signal that is in a frequency band different from the transmitted frequency band. For example, when the value of k3 is 3 and the supported frequency bands are 1800, 2100, and 2600, the transceiver multiplexer 41 may be configured to transmit a signal in the 1800 frequency band and receive the 1800 frequency band simultaneously, and on this basis, may further receive a signal in the 2100 frequency band and/or the 2600 frequency band; or the transceiver multiplexer 41 may be configured to transmit a signal in the 2100 frequency band and receive the 2100 frequency band at the same time, and on this basis, may further receive a signal in the 1800 frequency band and/or the 2600 frequency band; or the transceiver multiplexer 41 may be configured to transmit a signal of the 2600 frequency band and receive the 2600 frequency band at the same time, and on this basis, may further receive a signal in the 2100 frequency band and/or the 1800 frequency band. Specifically, reference may be made to an example in FIG. 4a. When the value of m3 is 6, the six transceiver multiplexers 41 may be classified into three multiplexer groups, and each multiplexer group includes two multiplexers. A transceiver multiplexer 41 connected to an antenna port ANT1 and a transceiver multiplexer 41 connected to an antenna port ANT4 are a first group, and receive and transmit frequency bands of the first group of transceiver multiplexers 41 are arranged as: 2600RX-1800RX-1800TX. A transceiver multiplexer 41 connected to an antenna port ANT2 and a transceiver multiplexer 41 connected to an antenna port ANT5 are a second group, and receive and transmit frequency bands of the second group of transceiver multiplexers 41 are arranged as: 2100RX-2100TX-1800RX. a transceiver multiplexer 41 connected to an antenna port ANT3 and a transceiver multiplexer 41 connected to an antenna port ANTE are a third group, and receive and transmit frequency bands of the third group of transceiver multiplexers 41 are arranged as: 2600TX-2600RX-2100RX.

Figure 4B:
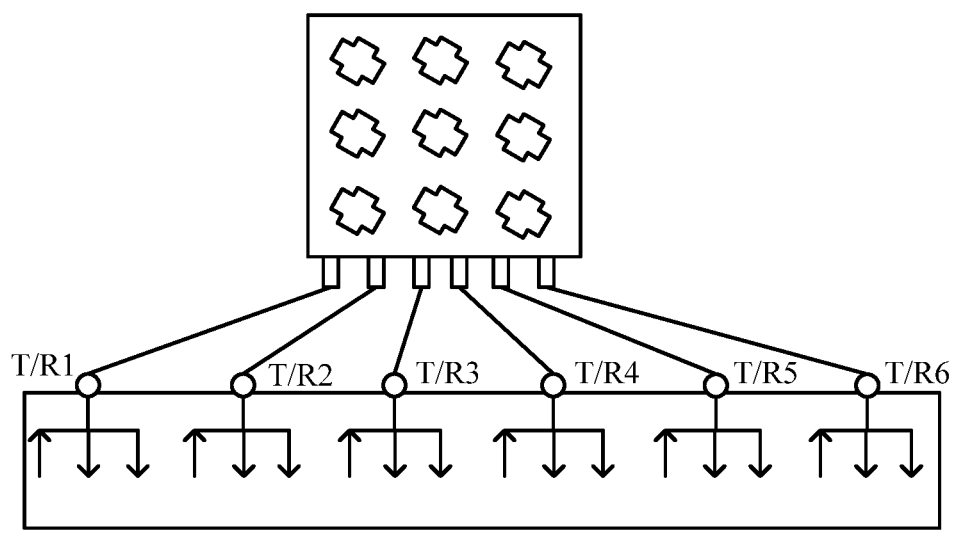

Further, FIG. 4b is another representation manner of the architecture of FIG. 4a. In FIG. 4b, an antenna is represented by an antenna plane, and each "x" in FIG. 4b represents two polarization directions of one column of antennas, and small blocks below the antenna plane in FIG. 4b are respectively ports ANT1, . . . , ANTN of the antenna. For ease of description, in FIG. 4b, a value of N is 6 and the value of k3 is 3. T/R1 in FIG. 4b represents a receive and transmit interface of a triplexer that is in FIG. 4a and that is connected to ANT1, and three arrows under T/R1 represent receive and transmit frequency bands (which are arranged as: 2600RX-1800RX-1800TX) of the triplexer. T/R2 in FIG. 4b represents a receive and transmit interface of a triplexer that is in FIG. 4a and that is connected to ANT2, and arrows under T/R2 represent receive and transmit frequency bands (which are arranged as: 2100RX-2100TX-1800RX) of the triplexer. T/R3 in FIG. 4b represents a receive and transmit interface of a triplexer that is in FIG. 4a and that is connected to ANT3, and arrows under T/R3 represent receive and transmit frequency bands (which are arranged as: 2600TX-2600RX-2100RX) of the triplexer. T/R4 in FIG. 4b represents a receive and transmit interface of a triplexer that is in FIG. 4a and that is connected to ANT4, and three arrows under T/R4 represent receive and transmit frequency bands (which are arranged as: 2600RX-1800RX-1800TX) of the triplexer. T/R5 in FIG. 4b represents a receive and transmit interface of a triplexer that is in FIG. 4a and that is connected to ANT5, and arrows under T/R5 represent receive and transmit frequency bands (which are arranged as: 2100RX-2100TX-1800RX) of the triplexer. T/R6 in FIG. 4b represents a receive and transmit interface of a triplexer that is in FIG. 4a and that is connected to ANTE, and arrows under T/R6 represent receive and transmit frequency bands (which are arranged as: 2600TX-2600RX-2100RX) of the triplexer. It should be noted that, FIG. 4a and FIG. 4b are a structure of a multi-frequency transceiver by using an example in which m3 is 6 and k3 is 3. In specific implementation, according to different values of m3 and k3, a quantity of transceiver multiplexers included in the multi-frequency transceiver may be different, and quantities of frequencies that are specifically transmitted and received by each transceiver multiplexer are also different. However, the embodiment shown in FIG. 4a shows that a transmit frequency and a receive frequency that are of a multiplexer are set on a premise that the transmit frequency and the receive frequency meet a same frequency band, and that a signal of another inter-frequency is received, so that an interval between frequencies on each multiplexer is increased, and therefore, when the multi-frequency transceiver shown in FIG. 4a of this embodiment of the present invention is used, compared with a solution in the prior art that a sixplexer is used to perform receiving and transmitting at the same time, an interval between frequency bands on each multiplexer is increased (to be specific: an interval between frequency bands of each multiplexer in FIG. 4b is larger than that in FIG. 1b). Therefore, the multi-frequency transceiver shown in FIG. 4a of this embodiment reduces a requirement for suppression of a transceiver filter channel of a multiplexer. In addition, because a frequency interval between frequency bands transmitted or frequency bands received on a same multiplexer is enlarged, a quantity of cavities of a filter of the multiplexer may be reduced, which facilitates multiplexer miniaturization, and in this way, an accompanying insertion loss is also reduced. In addition, after receiving and transmitting are separated, an intermodulation requirement on an antenna is also reduced, and a performance requirement on a multi-antenna of a multi-frequency transceiver is also reduced, so that costs of an antenna that is used are also reduced.

Accordingly, an embodiment provides a base station, and the base station may include the multi-frequency transceiver in the foregoing embodiments.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A multi-frequency transceiver, comprising a plurality of transceiver multiplexers, wherein each transceiver multiplexer comprises:
   a single transmit path, used to transmit a signal in one frequency band using an antenna; and
   at least two receive paths, wherein each receive path of the at least two receive paths is used to separately receive a signal in one frequency band using the antenna, wherein the frequency band of the signal transmitted by the single transmit path is different from each frequency band of each signal received by any receive path of the respective transceiver multiplexer; and wherein the plurality of transceiver multiplexers comprises N transceiver multiplexers, and in each transceiver multiplexer of the N transceiver multiplexers, a frequency band of a signal transmitted by a transmit path is one of N frequency bands, a frequency band of a signal received by each receive path of the at least two receive paths is one of the N frequency bands, and a frequency band of a signal transmitted by a transmit path in each transceiver multiplexer is different from a frequency band of a signal transmitted by a transmit path in any other transceiver multiplexer in the N transceiver multiplexers, wherein N is a positive integer greater than 2.

2. The multi-frequency transceiver according to claim 1, wherein the N transceiver multiplexers comprise M transceiver multiplexers, and each transceiver multiplexer in the M transceiver multiplexers comprises a same quantity of receive paths, wherein M is a positive integer less than N.

3. The multi-frequency transceiver according to claim 1, wherein the N transceiver multiplexers comprise a transceiver multiplexer in which a quantity of receive paths is different from a quantity of receive paths in another transceiver multiplexer of the N transceiver multiplexers.

4. The multi-frequency transceiver according to claim 1, wherein in the N transceiver multiplexers a total quantity of receive paths that receive a signal in a frequency band in the N frequency bands is the same as a total quantity of receive paths that receive another signal in a frequency band in the N frequency bands.

5. The multi-frequency transceiver according to claim 1, wherein the N frequency bands comprise a frequency band in which a total quantity of receive paths that receive signals on the frequency band in the N transceiver multiplexers is different from a total quantity of receive paths that receive signals on another frequency band in the N frequency bands in the N transceiver multiplexers.

6. A base station, comprising a multi-frequency transceiver, wherein the multi-frequency transceiver comprises a plurality of transceiver multiplexers, and each transceiver multiplexer comprises:
   a single transmit path, used to transmit a signal in one frequency band using an antenna; and
   at least two receive paths, wherein each receive path of the at least two receive paths is used to separately receive a signal in one frequency band using the antenna, wherein the frequency band of the signal transmitted by the single transmit path is different from each frequency band of each signal received by any receive path of the respective transceiver multiplexer; and wherein the multi-frequency transceiver comprises N transceiver multiplexers, and in each transceiver multiplexer of the N transceiver multiplexers, a frequency band of a signal transmitted by a transmit path is one of N frequency bands, a frequency band of a signal received by each receive path of the at least two receive paths is one of the N frequency bands, and a frequency band of a signal transmitted by a transmit path in each transceiver multiplexer is different from a frequency band of a signal transmitted by a transmit path in any other transceiver multiplexer in the N transceiver multiplexers, wherein N is a positive integer greater than 2.

7. The base station according to claim 6, wherein the N transceiver multiplexers comprise M transceiver multiplexers, and each transceiver multiplexer in the M transceiver multiplexers comprises a same quantity of receive paths, wherein M is a positive integer less than N.

8. The base station according to claim 6, wherein the N transceiver multiplexers comprise a transceiver multiplexer in which a quantity of receive paths is different from a quantity of receive paths in another transceiver multiplexer of the N transceiver multiplexers.

9. The base station according to claim 6, wherein in the N transceiver multiplexers a total quantity of receive paths that receive a signal in a frequency band in the N frequency bands is the same as a total quantity of receive paths that receive another signal in a frequency band in the N frequency bands.

10. The base station according to claim 6, wherein the N frequency bands comprise a frequency band in which a total quantity of receive paths that receive signals on the frequency band in the N transceiver multiplexers is different from a total quantity of receive paths that receive signals on another frequency band in the N frequency bands in the N transceiver multiplexers.

* * * * *